United States Patent
Sakata

(10) Patent No.: US 12,485,793 B2
(45) Date of Patent: Dec. 2, 2025

(54) CONTROL METHOD, CONTROL DEVICE, AND NON-TRANSITORY COMPUTER READABLE STORAGE MEDIUM

(71) Applicant: Panasonic Intellectual Property Corporation of America, Torrance, CA (US)

(72) Inventor: Ryuji Sakata, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 741 days.

(21) Appl. No.: 17/856,714

(22) Filed: Jul. 1, 2022

(65) Prior Publication Data
US 2022/0332216 A1    Oct. 20, 2022

Related U.S. Application Data

(63) Continuation of application No. PCT/JP2021/012329, filed on Mar. 24, 2021.

(30) Foreign Application Priority Data

Jun. 24, 2020 (JP) ................. 2020-108748

(51) Int. Cl.
| | |
|---|---|
| *B60L 58/14* | (2019.01) |
| *G07C 5/00* | (2006.01) |
| *G07C 5/08* | (2006.01) |

(52) U.S. Cl.
CPC ............ *B60L 58/14* (2019.02); *G07C 5/008* (2013.01); *G07C 5/0808* (2013.01);
(Continued)

(58) Field of Classification Search
CPC .. B60L 58/14; B60L 2250/16; B60L 2260/46; B60L 2260/54; B60L 2240/549;
(Continued)

(56) References Cited

U.S. PATENT DOCUMENTS

| | | | |
|---|---|---|---|
| 9,457,680 B2* | 10/2016 | Shinzaki | ............... B60L 58/13 |
| 2011/0245987 A1* | 10/2011 | Pratt | ..................... H02J 7/0068 |
| | | | 320/132 |

(Continued)

FOREIGN PATENT DOCUMENTS

| | | |
|---|---|---|
| EP | 2830185 | 1/2015 |
| JP | 2017-046421 | 3/2017 |

OTHER PUBLICATIONS

Extended European Search Report (EESR) from European Patent Office (EPO) in European Patent Appl. No. 21828010.5, dated Nov. 17, 2023.

(Continued)

*Primary Examiner* — Nha T Nguyen
(74) *Attorney, Agent, or Firm* — Greenblum & Bernstein, P.L.C.

(57) ABSTRACT

A control method including, by a computer, acquiring a current SOC value of the battery, acquiring history information related to a past power consumption amount in the vehicle, inputting the history information having been acquired to a learned model, and acquiring prediction information related to the necessary power amount, determining whether the current SOC value is larger than an optimum SOC value determined in advance for suppressing deterioration of the battery, upon determination that the current SOC value is larger than the optimum SOC value, calculating a target value of an SOC value of the battery based on the current SOC value, the optimum SOC value, and the prediction information, and outputting, to the charge and discharge device, control information instructing to discharge power from the battery to an electrical device outside the vehicle until the SOC value of the battery reaches the target value.

12 Claims, 7 Drawing Sheets

(52) U.S. Cl.
CPC ........ *G07C 5/0825* (2013.01); *B60L 2250/16* (2013.01); *B60L 2260/46* (2013.01); *B60L 2260/54* (2013.01)

(58) Field of Classification Search
CPC .......... B60L 53/14; B60L 58/16; B60L 55/00; G07C 5/008; G07C 5/0808; G07C 5/0825; H02J 3/322; H02J 7/0048; H02J 13/00002; Y02T 10/70; Y02T 90/16; Y02B 70/30; Y04S 20/242
See application file for complete search history.

(56) References Cited

U.S. PATENT DOCUMENTS

| | | |
|---|---|---|
| 2015/0054466 A1 | 2/2015 | Kinomura |
| 2017/0267115 A1* | 9/2017 | Unno ...................... B60L 58/13 |
| 2019/0160962 A1* | 5/2019 | Ichikawa .................. H02J 7/35 |
| 2019/0280509 A1* | 9/2019 | Yokoyama ................ H02J 7/00 |
| 2019/0288347 A1* | 9/2019 | Yokoyama .............. B60L 50/60 |

OTHER PUBLICATIONS

International Search Report (ISR) from International Searching Authority (Japan Patent Office) in International Pat. Appl. No. PCT/JP2021/012329, dated Jun. 1, 2021, together with an English language translation.

* cited by examiner

CONTROL METHOD, CONTROL DEVICE, AND NON-TRANSITORY COMPUTER READABLE STORAGE MEDIUM

TECHNICAL FIELD

The present disclosure relates to a technique for discharging power from a battery of a vehicle to an electrical device outside the vehicle.

BACKGROUND ART

In recent years, with the spread of electric vehicles, attention has been paid to a technique related to vehicle to home (V2H) for discharging power charged in a battery of an electric vehicle to an electrical device in a home, and a technique related to vehicle to building (V2B) for discharging power charged in a battery of an electric vehicle to electrical devices in a business premise and a factory.

As such a technique, for example, Patent Literature 1 discloses a technique for controlling charge and discharge of a battery of an electric vehicle by determining in advance different target values for charging and discharging of the battery for each predetermined time zone such as a midnight time zone and an activity time zone in consideration of reduction of an electricity rate and suppression of deterioration of the battery of the electric vehicle.

However, in the technique disclosed in Patent Literature 1, charge and discharge of the battery is controlled by a rule based on a target value determined in advance for each time zone. Therefore, deterioration of the battery of the vehicle cannot be suppressed by giving due consideration to a past use history of the vehicle by an individual user.

CITATION LIST

Patent Literature

Patent Literature 1: JP 2017-46421 A

SUMMARY OF INVENTION

The present disclosure has been made in view of the above problems, and an object of the present disclosure is to suppress deterioration of a battery of a vehicle by giving due consideration to a past use history of the vehicle by an individual user.

In order to solve the above problems, a control method according to one aspect of the present disclosure is a control method of controlling a charge and discharge device that charges and discharges a battery of a vehicle, the method including, by a computer, acquiring a current SOC value of the battery, acquiring history information related to a past power consumption amount in the vehicle, inputting the history information having been acquired to a learned model that has learned a relationship between the past power consumption amount of the vehicle and a necessary power amount when the vehicle is used next, and acquiring prediction information related to the necessary power amount, determining whether the current SOC value is larger than an optimum SOC value determined in advance for suppressing deterioration of the battery, upon determination that the current SOC value is larger than the optimum SOC value, calculating a target value of an SOC value of the battery at a time of discharging the battery based on the current SOC value, the optimum SOC value, and the prediction information, and outputting, to the charge and discharge device, control information instructing to discharge power from the battery to an electrical device outside the vehicle until the SOC value of the battery reaches the target value.

Figure 1:
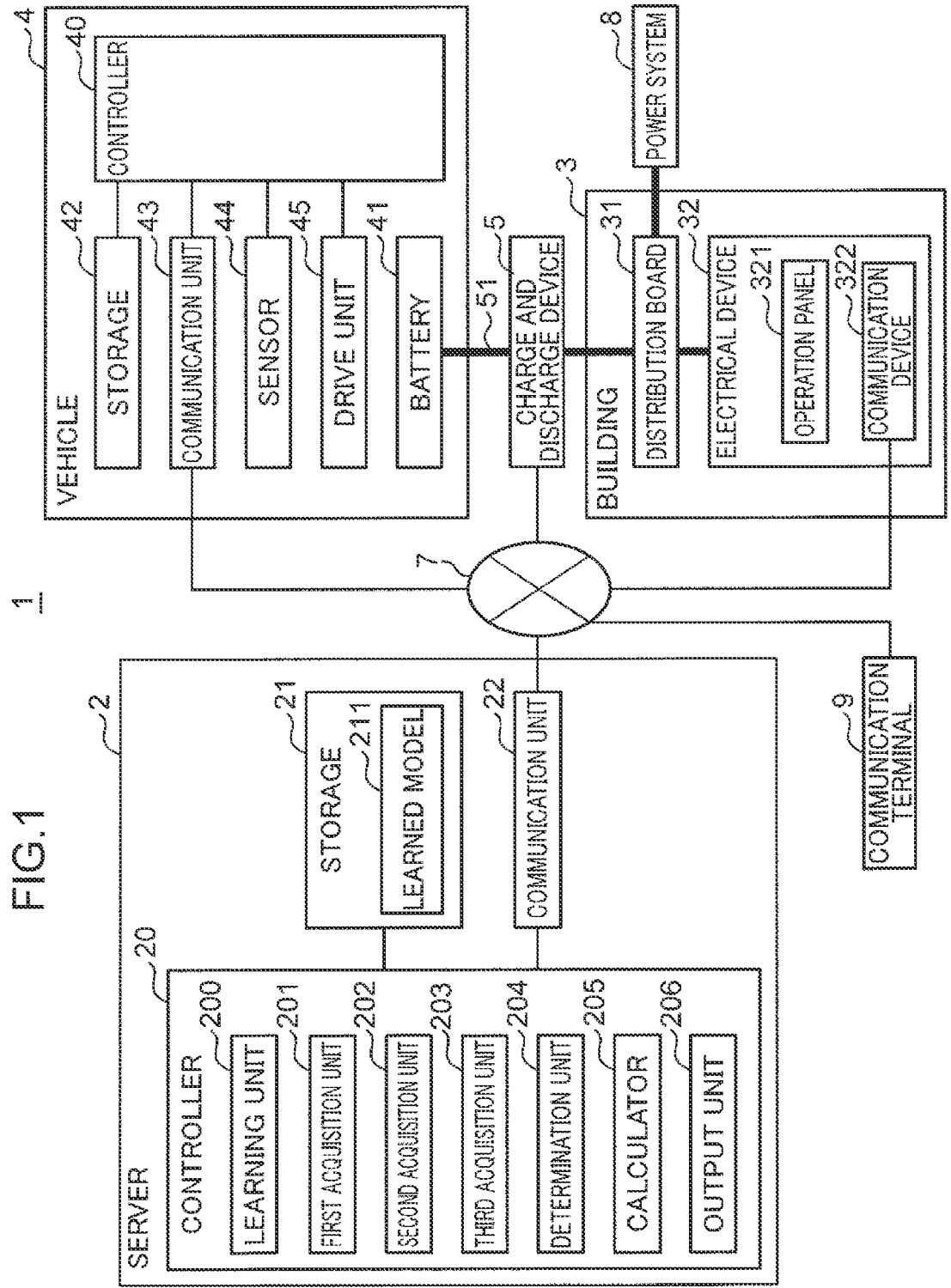
FIG. 1 is an overall configuration diagram of a vehicle discharge system.

DESCRIPTION OF EMBODIMENTS (Knowledge Underlying the Present Disclosure)

As described above, in recent years, techniques related to V2H and V2B for discharging from a battery of a vehicle such as an electric vehicle to an electrical device outside the vehicle have attracted attention. It has been known that when a battery of a vehicle is not used for a long period of time, deterioration progresses at a degree corresponding to the period and a state of charge (SOC) value. For this reason, it has been conventionally proposed in, for example, Patent Literature 1 and the like to control charge and discharge of a battery by setting a target value related to charge and discharge of the battery in advance for each time zone in consideration of suppressing deterioration of the battery.

However, in the conventional technique, charge and discharge of the battery is controlled on a rule basis using a predetermined target value in consideration of suppressing deterioration of the battery. Therefore, deterioration of the battery of the vehicle may not be suppressed by giving due consideration to a past use history of the vehicle by an individual user. For example, in the conventional technique, even in a time zone in which the user is easily predicted to use the vehicle for a long time in consideration of the user's past use history of the vehicle, the battery is charged and discharged using a target value corresponding to the time zone. As a result, power necessary for using the vehicle for a long time cannot be obtained from the battery, and there may be a problem that the vehicle cannot be used as desired by the user.

Therefore, as a result of intensive studies on suppressing deterioration of a battery of a vehicle in consideration of a past use history of the vehicle by an individual user, the present inventor has conceived the following aspects according to the present disclosure.

A control method according to one aspect of the present disclosure is a control method of controlling a charge and discharge device that charges and discharges a battery of a vehicle, the method including, by a computer, acquiring a current SOC value of the battery, acquiring history information related to a past power consumption amount in the vehicle, inputting the history information having been acquired to a learned model that has learned a relationship between the past power consumption amount of the vehicle and a necessary power amount when the vehicle is used next, and acquiring prediction information related to the necessary power amount, determining whether the current SOC value is larger than an optimum SOC value determined in advance for suppressing deterioration of the battery, upon determination that the current SOC value is larger than the optimum SOC value, calculating a target value of an SOC value of the battery at a time of discharging the battery based on the current SOC value, the optimum SOC value, and the prediction information, and outputting, to the charge and discharge device, control information instructing to discharge power from the battery to an electrical device outside the vehicle until the SOC value of the battery reaches the target value.

In this aspect, the history information related to the past power consumption amount of the vehicle is input to the learned model that has learned the relationship between the past power consumption amount of the vehicle and the necessary power amount when the vehicle is used next, and thus the prediction information related to the necessary power amount when the vehicle is used next is acquired. As a result, in this aspect, the necessary power amount when the vehicle is used next can be known by giving due consideration to the past power consumption amount of the vehicle by an individual user.

In this aspect, when the current SOC value is larger than the optimum SOC value, the control information instructing to discharge from the battery to the electrical device outside the vehicle is output to the charge and discharge device until the SOC value of the battery reaches the target value calculated on the basis of the current SOC value, the optimum SOC value, and the prediction information.

Therefore, in this aspect, when the current SOC value is larger than the optimum SOC value and it is considered necessary to suppress the deterioration of the battery, the battery can be discharged from the battery to the electrical device outside the vehicle until the SOC value of the battery reaches the target value calculated by giving due consideration to the past power consumption amount of the vehicle by an individual user. As a result, in this aspect, the deterioration of the battery of the vehicle can be suppressed by giving due consideration to the past use history of the vehicle by an individual user.

In the above aspect, the history information input to the learned model may further include information indicating a past use date and time of the vehicle, and the prediction information may include prediction date and time information indicating a date and time when the vehicle is used next.

In this aspect, the history information further including the information indicating the past use date and time of the vehicle is input to the learned model, and the prediction information acquired from the learned model includes the prediction date and time information indicating the date and time when the vehicle is used next. As a result, in this aspect, the deterioration of the battery of the vehicle can be suppressed by giving due consideration to the past use date and time of the vehicle by an individual user.

In the above aspect, the determining may further include determining whether an unused time as a time from a current time to a date and time indicated by the prediction date and time information is longer than a predetermined time, and the calculating may include calculating the target value upon determination that the current SOC value is larger than the optimum SOC value and the unused time is longer than the predetermined time.

In this aspect, when the current SOC value is larger than the optimum SOC value and the unused time is longer than the predetermined time, power is discharged from the battery to the electrical device outside the vehicle. Therefore, in this aspect, when the unused time is shorter than the predetermined time, and it is considered that deterioration of the battery due to non-use of the battery does not progress, discharge from the battery to the electrical device outside the vehicle can be avoided. As a result, in such a case, this aspect can avoid promoting deterioration of the battery by discharging from the battery to the electrical device outside the vehicle.

In the above aspect, the calculating may include calculating a necessary SOC value that covers the necessary power amount based on the prediction information, and calculating the optimum SOC value as the target value when the optimum SOC value is larger than the necessary SOC value.

In this aspect, when the optimum SOC value is larger than the necessary SOC value, power is discharged from the battery to the electrical device outside the vehicle until the SOC value of the battery reaches the optimum SOC value. Therefore, in this aspect, the battery can be discharged until the necessary power amount when the vehicle is used next can be covered and deterioration of the battery can be suppressed.

In the above aspect, the calculating may include calculating a necessary SOC value that covers the necessary power amount based on the prediction information, and when the optimum SOC value is smaller than or equal to the necessary SOC value, selecting a charge and discharge pattern having a minimum deterioration degree of the battery among a plurality of charge and discharge patterns determined in advance, based on the current SOC value, the optimum SOC value, and the necessary SOC value, and calculating the target value according to the charge and discharge pattern having been selected.

In this aspect, when the optimum SOC value is smaller than or equal to the necessary SOC value, power is discharged from the battery to the electrical device outside the vehicle until the SOC value of the battery reaches the target value according to a charge and discharge pattern having the minimum deterioration degree of the battery. Therefore, in this aspect, when the battery is discharged to the optimum SOC value, the necessary power amount when the vehicle is used next cannot be covered, the battery is discharged to the target value according to the charge and discharge pattern having the minimum deterioration degree of the battery, and the deterioration of the battery can be suppressed as much as possible.

In the above aspect, the calculating may include, when the necessary SOC value is larger than the optimum SOC value and the current SOC value, selecting a charge and discharge pattern having a minimum deterioration degree of the battery, out of a first charge and discharge pattern of charging the battery to the necessary SOC value immediately before the vehicle is used next, and a second charge and discharge pattern of discharging the battery to the optimum SOC value immediately after a current point of time and charging the battery to the necessary SOC value immediately before the vehicle is used next, calculating the current SOC value as the target value when the first charge and discharge pattern is selected, and calculating the optimum SOC value as the target value when the second charge and discharge pattern is selected.

In this aspect, when the necessary SOC value is larger than the optimum SOC value and the current SOC value, the current SOC value is calculated as the target value when the charge and discharge pattern having the minimum deterioration degree of the battery is the first charge and discharge pattern, and the optimum SOC value is calculated as the target value when the charge and discharge pattern having the minimum deterioration degree of the battery is the second charge and discharge pattern.

Accordingly, in this aspect, when the necessary SOC value is larger than the current SOC value, and the battery needs to be charged to cover the necessary power amount when the vehicle is used next, the battery is not charged or discharged, or the battery can be discharged to the optimum SOC value immediately after the current point of time in accordance with the charge and discharge pattern having the minimum deterioration degree of the battery. As a result, this aspect can suppress deterioration of the battery as much as possible until the vehicle is used next time.

In the above aspect, the calculating may include, when the necessary SOC value is larger than the optimum SOC value and smaller than the current SOC value, selecting a charge and discharge pattern having a minimum deterioration degree of the battery, among a second charge and discharge pattern of discharging the battery to the optimum SOC value immediately after a current point of time and charging the battery to the necessary SOC value immediately before the vehicle is used next, a third charge and discharge pattern of not charging or discharging the battery until the vehicle is used next, and a fourth charge and discharge pattern of discharging the battery to the necessary SOC value immediately after a current point of time and not charging or discharging the battery until the vehicle is used next, calculating the optimum SOC value as the target value when the second charge and discharge pattern is selected, calculating the current SOC value as the target value when the third charge and discharge pattern is selected, and calculating the necessary SOC value as the target value when the fourth charge and discharge pattern is selected.

In this aspect, when the necessary SOC value is larger than the optimum SOC value but smaller than the current SOC value and the charge and discharge pattern having the minimum deterioration degree of the battery is the second charge and discharge pattern, the optimum SOC value is calculated as the target value. When the charge and discharge pattern having the minimum deterioration degree of the battery is the third charge and discharge pattern, the current SOC value is calculated as the target value. When the charge and discharge pattern having the minimum deterioration degree of the battery is the fourth charge and discharge pattern, the necessary SOC value is calculated as the target value.

Accordingly, in this aspect, when the necessary power amount can be covered without charging the battery but the battery needs to be charged to cover the necessary power amount if the battery is discharged to the optimum SOC value to suppress deterioration of the battery, the battery is not charged or discharged, or the battery can be discharged to the necessary SOC value or the optimum SOC value immediately after the current point of time in accordance with the charge and discharge pattern having the minimum deterioration degree of the battery. As a result, this aspect can suppress deterioration of the battery as much as possible until the vehicle is used next time.

In the above aspect, the charge and discharge pattern may include at least one of a first period in which the battery is not charged or discharged or a second period in which the battery is charged or discharged, a deterioration degree of the battery in the first period may be calculated by a product of the first period and a predetermined first deterioration coefficient associated with the current SOC value, and a deterioration degree of the battery in the second period may be calculated by a product of a charge or discharge amount of the battery in the second period and a predetermined second deterioration coefficient associated with a type of the battery.

In this aspect, the deterioration degree of the battery in the first period included in the charge and discharge pattern and in which the battery is not charged or discharged is calculated by a product of the first period and a predetermined first deterioration coefficient associated with the current SOC value. The deterioration degree of the battery in the second period included in the charge and discharge pattern and in which the battery is charged or discharged is calculated by a product of a charge or discharge amount of the battery in the second period and a predetermined second deterioration coefficient associated with the type of the battery.

Therefore, in this aspect, the deterioration degree of the battery in each charge and discharge pattern including at least one of the first period or the second period can be appropriately calculated. As a result, in this aspect, the battery is not charged or discharged immediately after the current point of time in accordance with the charge and discharge pattern having the calculated minimum deterioration degree, and it is therefore possible to suppress deterioration of the battery as much as possible until the vehicle is used next.

In the above aspect, the outputting may include transmitting information inquiring whether to perform discharge indicated by the control information to a communication terminal owned by a user of the vehicle before outputting the control information, and outputting the control information when information indicating that the discharge indicated by the control information is to be performed is returned from the communication terminal.

In the above aspect, before outputting the control information, information inquiring whether to perform discharge indicated by the control information is transmitted to a communication terminal owned by a user of the vehicle, and when information indicating that discharge indicated by the control information is to be performed is returned from the communication terminal, the control information is output. Therefore, in this aspect, when permission to perform the discharge indicated by the control information is obtained from the user, the discharge indicated by the control information can be performed. As a result, it is possible to prevent the battery from becoming an SOC value not intended by the user when the user uses the vehicle next.

In the above aspect, the outputting may include receiving an input of an SOC value that is larger than or equal to the target value and smaller than the current SOC value before outputting the control information, transmitting information inquiring whether to select a discharge mode of discharging the battery to the SOC value having been received to the communication terminal owned by the user of the vehicle, and outputting information instructing to discharge the battery in the discharge mode instead of the control information to the charge and discharge device when the information indicating that the discharge mode is to be selected is returned from the communication terminal.

In this aspect, when information indicating that the discharge mode is to be selected is returned from the communication terminal before the control information is output, the battery is discharged to the SOC value that is equal to or larger than the target value input in the communication terminal and smaller than the current SOC value. As a result, in this aspect, the battery can be discharged with a discharge amount desired by the user while deterioration of the battery is suppressed as much as possible.

The present disclosure can also be implemented as a control program that causes a computer to execute each characteristic configuration included in the control method according to the above one aspect, or a control device that operates by the control program. It goes without saying that such a control program can be distributed via a computer-readable non-transitory recording medium such as a CD-ROM or a communication network such as the Internet.

(Embodiment)

Hereinafter, a vehicle discharge system according to an embodiment of the present disclosure will be described with reference to the drawings. FIG. 1 is an overall configuration diagram of a vehicle discharge system 1. The vehicle discharge system 1 is a system that controls discharge from a battery 41 of a vehicle 4 to an electrical device 32 outside the vehicle 4.

Specifically, as illustrated in FIG. 1, the vehicle discharge system 1 includes a building 3, a charge and discharge device 5, the vehicle 4, and a communication terminal 9 owned by a user who has made a contract for use of power supplied by a power system 8, and a server 2 (control device).

The building 3 includes, for example, a residential home in which the user lives and a business premise and a factory owned by the user. The building 3 includes a distribution board 31 and the electrical device 32.

The distribution board 31 distributes power supplied from the power system 8 to the electrical device 32 and the charge and discharge device 5.

The electrical device 32 operates on the power distributed by the distribution board 31. For example, the electrical device 32 includes an operation panel 321 including a touch panel and a display, a television, an air conditioner (not illustrated), and the like. The operation panel 321 displays information acquired from an external device and a predetermined operation screen on the display via a communication device 322 to be described later, and transmits information input to the operation screen by the user to the external device using the touch panel.

In addition, the electrical device 32 includes the communication device 322 such as a router used when the operation panel 321 or the like performs communication via a network 7 such as a local area network (LAN), the Internet, a telephone network, or the like.

The charge and discharge device 5 is electrically connected to the distribution board 31. One end of a charging cable 51 is electrically connected to the charge and discharge device 5. The other end of the charging cable 51 is electrically connected to the vehicle 4 such as an electric vehicle including the battery 41 that is chargeable and dischargeable. In addition, the charge and discharge device 5 incorporates a communication circuit (not illustrated) for communicating with an external device via the network 7.

Upon receipt of control information indicating an instruction to charge a target charge amount of power from the server 2 to the battery 41 of the vehicle 4 using the built-in communication circuit, the charge and discharge device 5 charges the battery 41 in accordance with the control information. Specifically, the charge and discharge device 5 supplies the target charge amount of power distributed by the distribution board 31 to the battery 41 of the vehicle 4 via the charging cable 51, the target charge amount being indicated by the control information.

Upon receipt of control information indicating an instruction to discharge a target discharge amount of power from the server 2 from the battery 41 of the vehicle 4 to the electrical device 32 using the built-in communication circuit, the charge and discharge device 5 discharges power from the battery 41 to the electrical device 32 outside of the vehicle 4 in accordance with the control information. Specifically, the charge and discharge device 5 supplies the target discharge amount of power charged by the battery 41 to the electrical device 32 outside the vehicle 4 via the charging cable 51 and the distribution board 31, the target discharge amount being indicated by the control information.

The vehicle 4 includes, for example, a vehicle provided with the battery 41 which is chargeable and dischargeable, such as an electric vehicle, a hybrid vehicle, and an electric bicycle. The vehicle 4 includes the battery 41, a storage 42, a communication unit 43, a sensor 44, a drive unit 45, and a controller 40.

The battery 41 includes a chargeable secondary battery such as a lithium ion battery. The battery 41 is detachably connected to the charging cable 51 connected to the charge and discharge device 5. The battery 41 is charged by power supplied from the charge and discharge device 5 via the charging cable 51. The battery 41 supplies power charged by the battery 41 to the electrical device 32 outside the vehicle 4 via the charging cable 51 under control of the charge and discharge device 5.

The storage 42 includes a non-volatile memory that stores a predetermined control program and a memory such as a RAM that temporarily stores information. The storage 42 stores various types of information related to control of charge and discharge of the battery 41.

For example, each time the vehicle 4 is used, the storage 42 stores history information related to a past power consumption amount in the vehicle 4. The history information includes a use date and time of the vehicle 4 and information indicating a power consumption amount of the battery 41 at the use date and time. The information indicating the use date and time of the vehicle 4 includes information indicating the date and time when the vehicle 4 is started to be used. The information indicating the use date and time of the vehicle 4 may include the date and time when the use of the vehicle 4 is ended. The storage 42 also stores a current state of charge (SOC) value (hereinafter, current SOC value) of the battery 41.

The communication unit 43 includes a communication circuit for communicating with an external device such as the server 2 via the network 7. The communication unit 43 outputs information received from the external device to the controller 40, and transmits the information input from the controller 40 to the external device.

The sensor 44 includes an SOC sensor, a timer, a power amount sensor, and the like, and detects the current SOC value of the battery 41, a current date and time, and a power consumption amount of the battery 41.

The drive unit 45 includes a drive motor (not illustrated) or the like that controls a direction and rotation of wheels provided on a bottom surface of a body of the vehicle 4.

The controller 40 includes a processor such as a central processing unit (CPU). The controller 40 controls each part of the vehicle 4 by executing the control program stored in the storage 42.

For example, when the use of the vehicle 4 is started, the controller 40 stores information indicating the current date and time detected using the sensor 44 in the storage 42 as information indicating the use date and time of the vehicle 4 included in the history information.

The controller 40 periodically detects the current SOC value of the battery 41 using the sensor 44 after the start of use of the vehicle 4 until the end of use of the vehicle 4. The controller 40 periodically updates the current SOC value stored in the storage 42 with the detected current SOC value.

The controller 40 periodically detects the power consumption amount of the battery 41 using the sensor 44 after the start of use of the vehicle 4 until the end of use of the vehicle 4. The controller 40 periodically updates the information indicating the power consumption amount in the history information stored in the storage 42 and including the date and time when the use of the vehicle 4 is started as the information indicating the use date and time of the vehicle 4 with the information indicating a cumulative value of the power consumption amount detected from the date and time when the use of the vehicle 4 is started to a current time.

Upon receipt of the control information indicating the instruction to transmit the current SOC value transmitted from the server 2 by the communication unit 43, the controller 40 causes the communication unit 43 to return the information indicating the current SOC value stored in the storage 42 to the server 2. Note that the present disclosure is not limited thereto, and the controller 40 may periodically transmit the information indicating the current SOC value to the server 2 by the communication unit 43.

Upon receipt of the control information indicating the instruction to transmit the history information transmitted from the server 2 by the communication unit 43, the controller 40 causes the communication unit 43 to return the information indicating the history information stored in the storage 42 to the server 2.

The communication terminal 9 is, for example, a smartphone, a tablet terminal, and/or a laptop computer owned by the user, and communicates various types of information with an external device via the network 7. The communication terminal 9 includes a display and a touch panel (not illustrated). The communication terminal 9 displays information received from the external device and a predetermined operation screen on the display, and transmits information input to the operation screen by the user to the external device using the touch panel.

The server 2 communicates with the vehicle 4, the charge and discharge device 5, and the communication terminal 9 via the network 7, and controls discharge from the battery 41 of the vehicle 4 to the electrical device 32 outside the vehicle 4. Specifically, the server 2 includes a storage 21, a communication unit 22, and a controller 20.

The storage 21 includes a non-volatile memory that stores a predetermined control program and a memory such as a RAM that temporarily stores information. The storage 21 stores various types of information related to control to cause the charge and discharge device 5 to charge and discharge the battery 41 of the vehicle 4.

For example, the storage 21 stores a learned model 211 that has learned a relationship between the past power consumption amount of the vehicle 4 and a necessary power amount when the vehicle 4 is used next. The learned model 211 also learns the relationship between past use date and time of the vehicle 4 and date and time when the vehicle 4 is used next. The learned model 211 will be described later in detail.

The storage 21 stores a predetermined optimum SOC value for suppressing deterioration of the battery 41. The optimum SOC value is determined to be an SOC value when deterioration of the battery 41 is most suppressed, for example, on the basis of an experimental value or the like. Note that the optimum SOC value is not limited to this value, and for example, a predetermined representative value within a range, such as at least a center value within a range of an SOC value capable of suppressing the deterioration of the battery 41, may be set as the optimum SOC value.

The storage 21 stores information indicating a plurality of predetermined charge and discharge patterns in advance. The charge and discharge patterns define a procedure for charging and discharging the battery 41, and include at least one of a first period in which the battery 41 is not charged or discharged or a second period in which the battery 41 is charged or discharged. The charge and discharge patterns will be described later in detail.

The storage 21 stores various coefficients used for calculating a deterioration degree of the battery 41. The coefficients include a first deterioration coefficient used for calculating a deterioration degree of the battery 41 in the first period in which the battery 41 is not charged or discharged, and a second deterioration coefficient used for calculating a deterioration degree of the battery 41 in the second period in which the battery 41 is charged or discharged. The first deterioration coefficient is a coefficient that varies depending on the current SOC value of the battery 41. The storage 21 stores a plurality of first deterioration coefficients in association with a plurality of current SOC values. The second deterioration coefficient that varies depending on a type of the battery 41 such as a lithium ion battery and a nickel hydrogen battery. The storage 21 stores a plurality of second deterioration coefficients in association with a plurality of types of battery 41.

The communication unit 22 includes a communication circuit for communicating with an external device such as the vehicle 4. The communication unit 22 outputs information received from the external device to the controller 20, and transmits the information input from the controller 20 to the external device.

The controller 20 includes a microcomputer (computer) provided with a CPU and the like. The controller 20 controls an operation of each part of the server 2 by executing the control program stored in the storage 21.

For example, the controller 20 functions particularly as a learning unit 200, a first acquisition unit 201, a second acquisition unit 202, a third acquisition unit 203, a determination unit 204, a calculator 205, and an output unit 206 by executing the control program stored in the storage 21.

History information related to the past power consumption amount in the vehicle 4 is input to the learning unit 200. The history information includes the past use date and time of the vehicle 4 and information indicating a power consumption amount of the battery 41 at the use date and time. The learning unit 200 performs machine learning such as deep learning using a neural network by using the input history information, creates the learned model 211 that has learned a relationship between the past use date and time of the vehicle 4 and the power consumption amount at the use date and time, and the next use date and time of the vehicle 4 and a necessary power amount when the vehicle 4 is used at the date and time, and stores the learned model 211 in the storage 21.

For example, when history information including the use date and time of two consecutive uses of the vehicle 4 and the power consumption amount at the use date and time is input to the learning unit 200, the learning unit 200 performs machine learning with the history information of the first use as an explanatory variable and the history information of the second use as an objective variable. As a result, when the history information for one use is input, the learning unit 200 creates the learned model 211 that predicts the date and time when the vehicle 4 is used next and the necessary power amount when the vehicle 4 is used at the date and time. Note that the learned model 211 can also be created in units of days of the week instead of in units of date and time. In this case, the history information only needs to include a day of the week when the vehicle 4 is used and information indicating a power consumption amount of the battery 41 on the day.

The first acquisition unit 201, the second acquisition unit 202, the third acquisition unit 203, the determination unit 204, the calculator 205, and the output unit 206 will be described later in detail.

Figure 2:
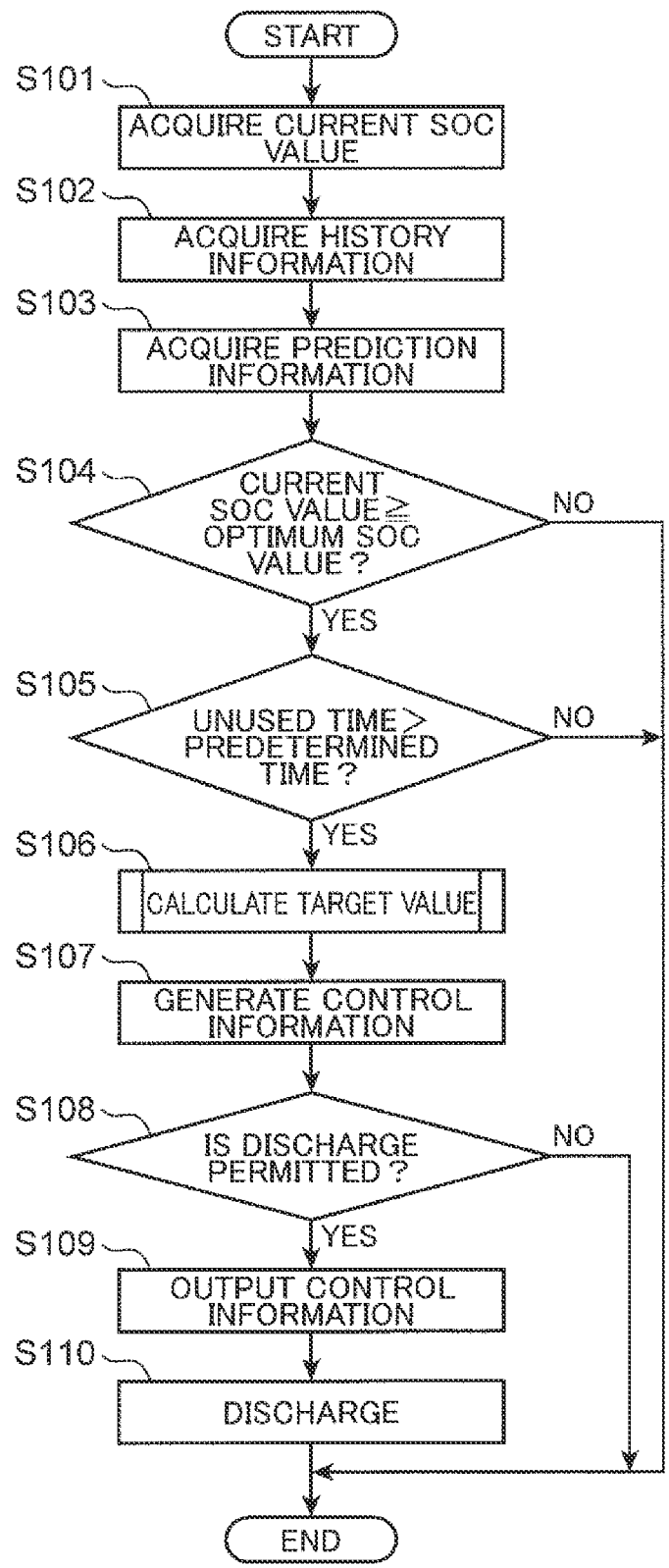
FIG. 2 is a flowchart illustrating an example of an operation of control for causing a charge and discharge device to discharge a battery of a vehicle.

Next, an operation of control in which the controller 20 causes the charge and discharge device 5 to discharge the battery 41 of the vehicle 4 (hereinafter, discharge control) will be described. In the following description, the first acquisition unit 201, the second acquisition unit 202, the third acquisition unit 203, the determination unit 204, the calculator 205, and the output unit 206 will be described in detail. FIG. 2 is a flowchart illustrating an example of the operation of the control for causing the charge and discharge device 5 to discharge the battery 41 of the vehicle 4.

As shown in FIG. 2, in the server 2, when the controller 20 starts the operation of the discharge control, the first acquisition unit 201 acquires the current SOC value of the battery 41 (step S101). Specifically, in step S101, the first acquisition unit 201 controls the communication unit 22 to transmit the control information indicating the instruction to transmit the current SOC value to the vehicle 4. In response to this, as described above, when the information indicating the current SOC value is returned from the vehicle 4, the first acquisition unit 201 acquires the returned information indicating the current SOC value of the vehicle 4 via the communication unit 22.

Next, the second acquisition unit 202 acquires history information related to the past power consumption amount in the vehicle 4 (step S102). Specifically, in step S102, the second acquisition unit 202 controls the communication unit 22 to transmit the control information indicating the instruction to transmit the history information to the vehicle 4. In response to this, as described above, when the history information is returned from the vehicle 4, the second acquisition unit 202 acquires the returned history information via the communication unit 22. Note that the history information acquired in step S102 is input to the learning unit 200. When the history information is input, the learning unit 200 creates the learned model 211 using the input history information and stores the learned model 211 in the storage 21 as described above.

Next, the third acquisition unit 203 inputs history information corresponding to the latest use date and time acquired in step S102 to the learned model 211, and acquires prediction information related to the necessary power amount when the vehicle 4 is used next (step S103). The prediction information includes the information predicted by the learned model 211 and indicating the date and time when the vehicle 4 is used next and the necessary power amount when the vehicle 4 is used at the date and time.

Next, the determination unit 204 determines whether the current SOC value acquired in step S101 is larger than or equal to the optimum SOC value stored in the storage 21 (step S104).

Upon determination in step S104 that the current SOC value is not larger than or equal to the optimum SOC value (NO in step S104), the controller 20 ends the operation of the discharge control. This avoids discharge of the battery 41 when the current SOC value is smaller than the optimum SOC value and the battery 41 may deteriorate even if the battery 41 is left unused. Consequently, the battery 41 is prevented from being deteriorated progressively due to discharge of the battery 41.

On the other hand, upon determination in step S104 that the current SOC value is larger than or equal to the optimum SOC value (YES in step S104), the determination unit 204 determines whether unused time as time from the current time until the date and time when the vehicle 4 is used next is longer than a predetermined time (step S105).

Specifically, in step S105, the determination unit 204 acquires information that is included in the prediction information acquired in step S103 and indicates the date and time when the vehicle 4 is used next (hereinafter, prediction date and time information). The determination unit 204 calculates time from the current time to the date and time indicated by the acquired prediction date and time information as the unused time, and determines whether the calculated unused time is longer than a predetermined time. Note that the predetermined time is determined to be, for example, time from when the battery 41 whose SOC value is not the optimum SOC value is started to be left unused until deterioration occurs in the battery 41 (for example, 24 hours), on the basis of an experimental value or the like.

Upon determination in step S105 that the unused time is not larger than the predetermined time (NO in step S105), the controller 20 ends the operation of the discharge control. This avoids discharge of the battery 41 when the vehicle 4 is predicted to be used within the predetermined time and the battery 41 may not be deteriorated even if the battery 41 is left unused. Consequently, the battery 41 is prevented from being deteriorated progressively due to discharge of the battery 41. It is also possible to avoid hindering the use of the vehicle 4 by the user due to discharge of the battery 41.

On the other hand, upon determination in step S105 that the unused time is longer than the predetermined time (YES in step S105), the calculator 205 calculates a target value of the SOC value of the battery 41 at a time of discharging the battery 41 on the basis of the current SOC value acquired in step S101, the optimum SOC value stored in the storage 21, and the prediction information acquired in step S103 (step S106). Step S106 will be described later in detail.

Next, the output unit 206 generates control information instructing to discharge power from the battery 41 to the electrical device 32 outside the vehicle 4 until the SOC value of the battery 41 reaches the target value calculated in step S106 (step S107). Specifically, the output unit 206 calculates a result obtained by subtracting the current SOC value acquired in step S101 from the target value calculated in step S106 as a target discharge amount to be discharged from the battery 41 to the electrical device 32. Then, the output unit 206 generates, as control information, information indicating an instruction to discharge the target discharge amount of power from the battery 41 of the vehicle 4 to the electrical device 32.

Next, the output unit 206 inquires of the user of the vehicle 4 whether to permit the discharge indicated by the control information generated in step S107 to be performed (step S108).

Specifically, in step S108, the output unit 206 controls the communication unit 22 to transmit information inquiring whether to perform the discharge indicated by the control information generated in step S107 (hereinafter, inquiry information) to the communication terminal 9 owned by the user of the vehicle 4.

It is assumed that the output unit 206 acquires, via the communication unit 22, information returned from the communication terminal 9 and indicating that the discharge indicated by the control information is not to be performed until a predetermined time elapses after the transmission of the inquiry information. In this case, the output unit 206 determines that the user of the vehicle 4 has not permitted the discharge indicated by the control information to be performed (NO in step S108). When the communication unit 22 does not receive a reply from the communication terminal 9 at a point of time when the predetermined time has elapsed after the transmission of the inquiry information, the output unit 206 determines that the user of the vehicle 4 has not permitted the discharge indicated by the control information to be performed (NO in step S108). In these cases, the controller 20 terminates the operation of the discharge control.

On the other hand, upon acquisition of the information returned from the communication terminal 9 and indicating that the discharge indicated by the control information is to be performed via the communication unit 22, the output unit 206 determines that the user of the vehicle 4 has permitted the discharge indicated by the control information to be performed (YES in step S108).

In this case, the output unit 206 transmits the control information generated in step S107 to the charge and discharge device 5 (step S109). Upon receipt of the control information transmitted in step S109, the charge and discharge device 5 discharges power from the battery 41 to the electrical device 32 outside the vehicle 4 in accordance with the control information (step S110). Specifically, in step S110, the charge and discharge device 5 supplies the target discharge amount of power charged by the battery 41 to the electrical device 32 outside the vehicle 4 via the charging cable 51 and the distribution board 31, the target discharge amount being indicated by the control information.

Figure 3:
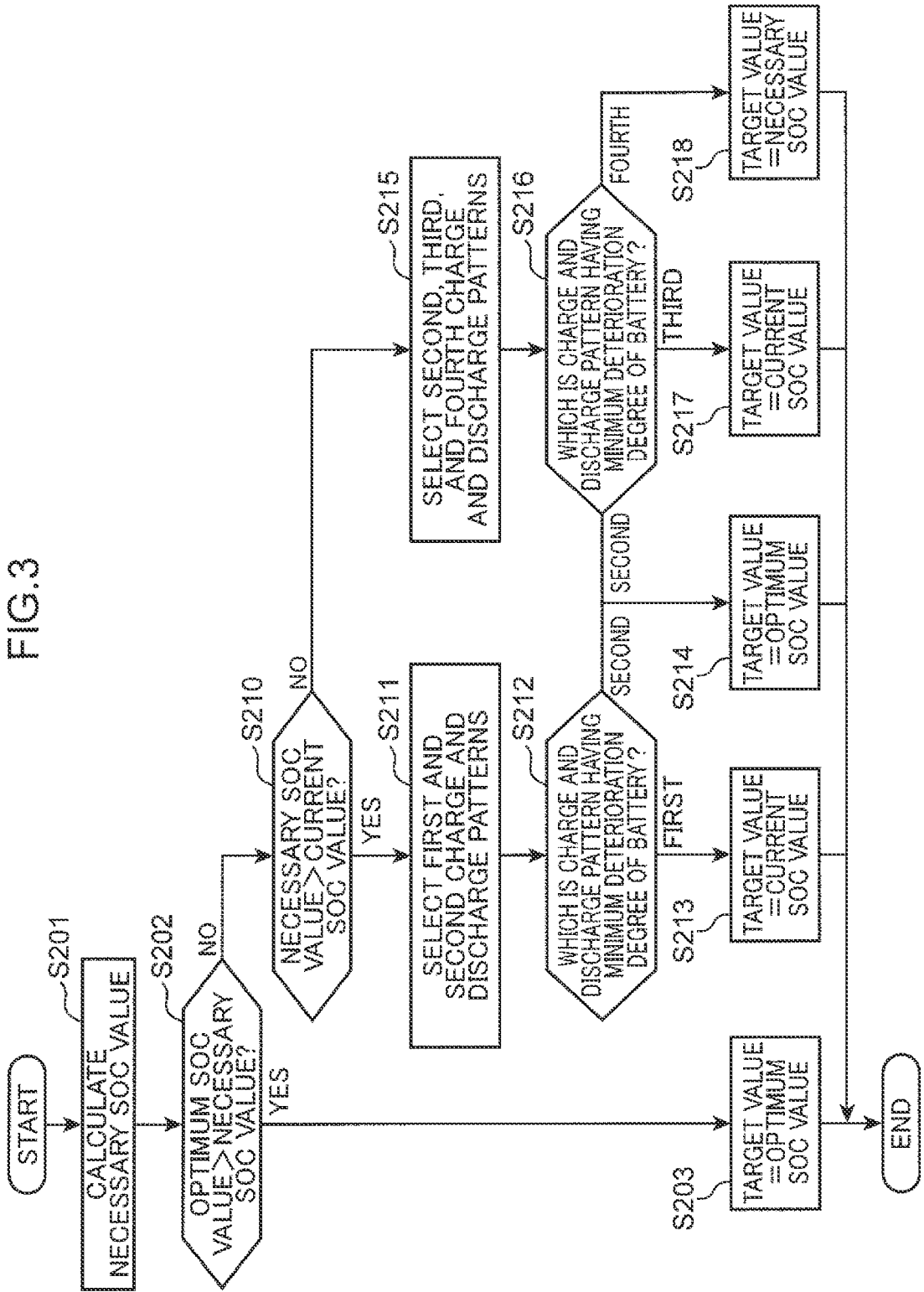
FIG. 3 is a flowchart illustrating an example of processing of calculating a target value of an SOC value of the battery when the battery is discharged.

Next, processing of calculating the target value of the SOC value of the battery 41 at the time of discharging the battery 41 in step S106 (FIG. 2) will be described in detail. FIG. 3 is a flowchart illustrating an example of the processing of calculating the target value of the SOC value of the battery 41 at the time of discharging the battery 41.

As shown in FIG. 3, upon start of step S106 (FIG. 2), the calculator 205 calculates a necessary SOC value capable of covering the necessary power amount when the vehicle 4 is used next on the basis of the prediction information acquired in step S103 (step S201).

Specifically, in step S201, the calculator 205 calculates, as the necessary SOC value, a sum of the SOC value of the battery 41 corresponding to the necessary power amount when the vehicle 4 is used next indicated by the prediction information and a predetermined margin SOC value. Here, the predetermined margin SOC value is an SOC value set as a margin such that the battery 41 can cover the necessary power amount of power, that is, in order to reliably discharge the necessary power amount of power from the battery 41. The predetermined margin SOC value may be 0 or does not have to be set.

Next, the calculator 205 determines whether the optimum SOC value stored in step the storage 21 is larger than the necessary SOC value calculated in step S201 (step S202).

Upon determination in step S202 that the optimum SOC value is larger than the necessary SOC value (YES in step S202), the calculator 205 calculates the optimum SOC value as the target value (step S203).

In this case, in step S107 (FIG. 2), a result obtained by subtracting the current SOC value acquired in step S101 from the optimum SOC value as the target value is calculated as the target discharge amount, and control information indicating an instruction to discharge the target discharge amount of power from the battery 41 of the vehicle 4 to the electrical device 32 is generated. Accordingly, in step S110 (FIG. 2), the target discharge amount of power is discharged from the battery 41 of the vehicle 4 to the electrical device 32. As a result, the SOC value of the battery 41 becomes the optimum SOC value, and the deterioration of the battery 41 is suppressed.

On the other hand, upon determination in step S202 that the optimum SOC value is smaller than or equal to the necessary SOC value (NO in step S202), the calculator 205 performs processing in and after step S210. As a result, the calculator 205 selects a charge and discharge pattern having a minimum deterioration degree of the battery 41 among the plurality of predetermined charge and discharge patterns on the basis of the current SOC value, the optimum SOC value, and the necessary SOC value, and calculates the target value according to the selected charge and discharge pattern.

Specifically, upon determination in step S202 that the optimum SOC value is smaller than or equal to the necessary SOC value (NO in step S202), the calculator 205 determines whether the necessary SOC value calculated in step S201 is larger than the current SOC value (step S210).

As a result, the calculator 205 determines whether it is necessary to charge the battery 41 in order to cause the battery 41 to supply the necessary power amount when the vehicle 4 is used next indicated by the prediction information at the date and time when the vehicle 4 is used next indicated by the prediction date and time information included in the prediction information acquired in step S103 (FIG. 2).

Next, upon determination in step S210 that the necessary SOC value is larger than the current SOC value (YES in step S210), the calculator 205 selects a first charge and discharge pattern and a second charge and discharge pattern for setting the SOC value of the battery 41 at the date and time when the vehicle 4 is used next as the necessary SOC value (step S211).

Figure 4:
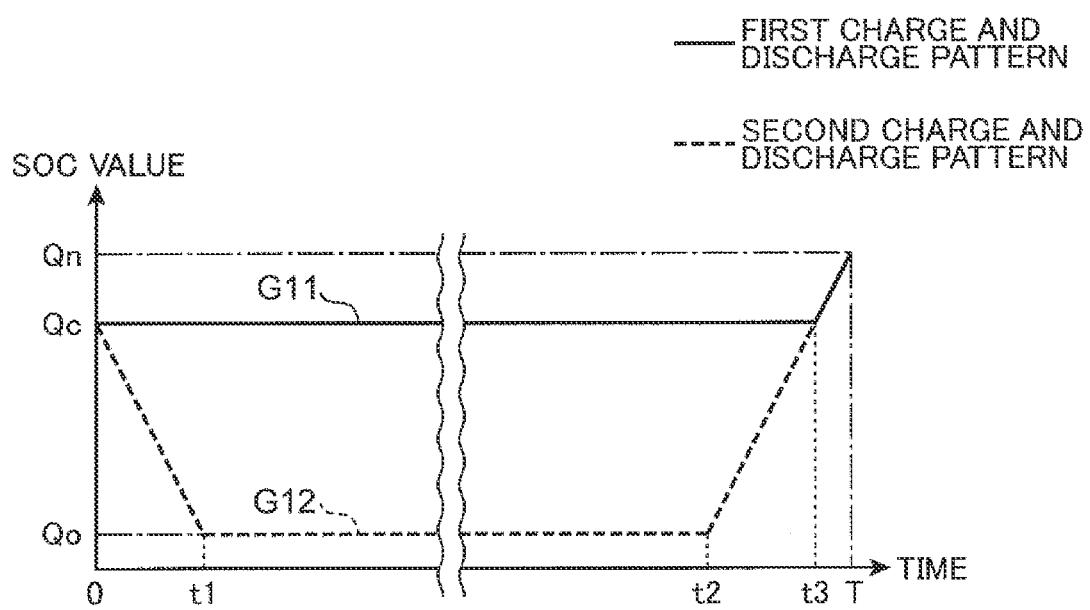
FIG. 4 is a diagram illustrating an example of a first charge and discharge pattern and a second charge and discharge pattern.

FIG. 4 is a diagram illustrating an example of a first charge and discharge pattern G11 and a second charge and discharge pattern G12. In FIG. 4, a horizontal axis represents an elapsed time from a current point of time, and a vertical axis represents the SOC value of the battery 41. In the horizontal axis in FIG. 4, 0 indicates the current point of time, and T represents an elapsed time from the current point of time to the date and time when the vehicle 4 is used next, indicated by the prediction date and time information included in the prediction information acquired in step S103 (FIG. 2). In the vertical axis in FIG. 4, Qn represents the necessary SOC value, Qc represents the current SOC value, and Qo represents the optimum SOC value.

As illustrated in FIG. 4, the first charge and discharge pattern G11 is a charge and discharge pattern in which the battery 41 is not charged or discharged until immediately before the next use of the vehicle 4, and the battery 41 is charged to the necessary SOC value Qn immediately before the next use of the vehicle 4. The second charge and discharge pattern G12 is a charge and discharge pattern in which the battery 41 is discharged to the optimum SOC value Qo immediately after the current point of time, thereafter, the battery 41 is not charged or discharged until immediately before the next use of the vehicle 4, and the battery 41 is charged to the necessary SOC value Qn immediately before the next use of the vehicle 4.

Next, the calculator 205 determines a charge and discharge pattern having a minimum deterioration degree of the first charge and discharge pattern G11 or the second charge and discharge pattern G12 selected in step S211 (step S212).

Specifically, in step S212, the calculator 205 calculates the deterioration degree of the battery 41 in the first period in which the battery 41 is not charged or discharged by a product of the first period and a predetermined first deterioration coefficient associated with the current SOC value Qc. The calculator 205 calculates the deterioration degree of the battery 41 in the second period in which the battery 41 is charged or discharged by a product of a charge and discharge amount of the battery 41 in the second period and a predetermined second deterioration coefficient associated with the type of the battery 41.

That is, the calculator 205 calculates a deterioration degree D1 of the battery 41 in the first charge and discharge pattern G11 using the following Equation (1).

$$D1 = T1 \times K1[Qc] + (Qn - Qc) \times K2[Li] \qquad (1)$$

In Equation (1), T1 represents the first period during which the battery 41 is not charged or discharged. Specifically, the first period T1 included in the first charge and discharge pattern G11 corresponds to a period from the current point of time to a time t3 as shown in FIG. 4. However, the first period T1 may be approximated by a period (T−0) from the current time to the next use of the vehicle 4. In Equation (1), K1 [Qc] represents a first deterioration coefficient associated with the current SOC value Qc. In Equation (1), Li indicates that the type of the battery 41 is a lithium ion battery, and K2 [Li] indicates a second deterioration coefficient associated with the lithium ion battery.

Meanwhile, the calculator 205 calculates a deterioration degree D2 of the battery 41 in the second charge and discharge pattern G12 using the following Equation (2).

$$D2 = (Qc - Qo) \times K2[Li] + T1 \times K1[Qo] + (Qn - Qo) \times K2[Li] \qquad (2)$$

In Equation (2), T1 represents the first period during which the battery 41 is not charged or discharged. Specifically, the first period T1 included in the second charge and discharge pattern G12 corresponds to a period (t2-t1) shown in FIG. 4 from a point of time when a time t1 has elapsed from the current point of time to a point of time when a time t2 has elapsed from the current point of time. However, the first period T1 may be approximated by a period (T−0) from the current time to the next use of the vehicle 4. In Equation (2), K1 [Qo] and K2 [Li] represent, as in Equation (1), the first deterioration coefficient associated with the current SOC value Qo in the first period T1 and the second deterioration coefficient associated with the lithium ion battery, respectively. A method of calculating the deterioration degree of the battery 41 in each charge and discharge pattern described above is merely an example, and the deterioration degree of the battery 41 in each charge and discharge pattern may be calculated by another calculation method.

Upon determination in step S212 that the charge and discharge pattern having the minimum deterioration degree of the battery 41 is the first charge and discharge pattern G11 (first in step S212), the calculator 205 calculates the current SOC value Qc as the target value of the SOC value of the battery 41 at the time of discharging the battery 41 (step S213).

In this case, in step S107 (FIG. 2), 0, which is a result obtained by subtracting the current SOC value Qc acquired in step S101 from the current SOC value Qc as the target value, is calculated as the target discharge amount. In this case, since it is not necessary to discharge power from the battery 41 to the electrical device 32, the output unit 206 does not perform processing in and after step S108 (FIG. 2), and the controller 20 ends the operation of the discharge control. In this case, power is not discharged from the battery 41 of the vehicle 4 to the electrical device 32, and as shown in the first charge and discharge pattern G11 (FIG. 4), the battery 41 is left without being charged or discharged immediately after the current point of time.

However, the present disclosure is not limited thereto, and in step S107 (FIG. 2), the output unit 206 may generate control information indicating an instruction to discharge power of a target discharge amount of 0 from the battery 41 of the vehicle 4 to the electrical device 32 and perform the processing in and after step S108. In this case, in step S110 (FIG. 2), the target discharge amount of 0 is discharged from the battery 41 of the vehicle 4 to the electrical device 32. That is, power is not actually discharged from the battery 41 of the vehicle 4 to the electrical device 32, and as shown in the first charge and discharge pattern G11 (FIG. 4), the battery 41 is left without being charged or discharged immediately after the current point of time.

On the other hand, upon determination in step S212 that the charge and discharge pattern having the minimum deterioration degree of the battery 41 is the second charge and discharge pattern G12 (second in step S212), the calculator 205 calculates the optimum SOC value Qo as the target value of the SOC value of the battery 41 at the time of discharging the battery 41 (step S214).

In this case, in step S107 (FIG. 2), a result obtained by subtracting the current SOC value Qc acquired in step S101 from the optimum SOC value Qo as the target value is calculated as the target discharge amount, and the control information indicating an instruction to discharge the target discharge amount of power from the battery 41 of the vehicle 4 to the electrical device 32 is generated. As a result, in step S110 (FIG. 2), as shown in the second charge and discharge pattern G12 (FIG. 4), immediately after the current point of time, power is discharged from the battery 41 to the electrical device 32 until the SOC value of the battery 41 reaches the optimum SOC value Qo.

On the other hand, upon determination in step S210 that the necessary SOC value is smaller than or equal to the current SOC value (NO in step S210), the calculator 205 selects the second charge and discharge pattern, a third charge and discharge pattern, and a fourth charge and discharge pattern for setting the SOC value of the battery 41 at the date and time when the vehicle 4 is used next as the necessary SOC value or the current SOC value (step S215).

Figure 5:
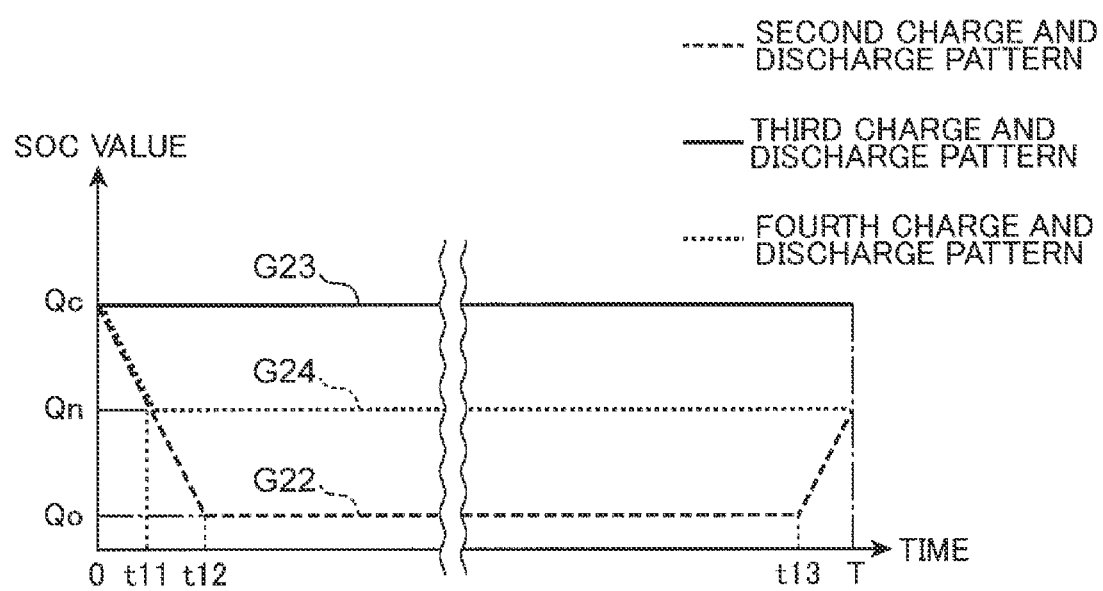
FIG. 5 is a diagram illustrating an example of the second charge and discharge pattern, a third charge and discharge pattern, and a fourth charge and discharge pattern.

FIG. 5 is a diagram illustrating an example of a second charge and discharge pattern G22, a third charge and discharge pattern G23, and a fourth charge and discharge pattern G24. In FIG. 5, the horizontal axis represents an elapsed time from the current point of time, and the vertical axis represents the SOC value of the battery 41. In the horizontal axis in FIG. 5, 0 indicates the current point of time, and T represents an elapsed time from the current point of time to the date and time when the vehicle 4 is used next, indicated by the prediction date and time information included in the prediction information acquired in step S103 (FIG. 2). In the vertical axis in FIG. 5, Qn represents the necessary SOC value, Qc represents the current SOC value, and Qo represents the optimum SOC value.

As shown in FIG. 5, the second charge and discharge pattern G22 is a charge and discharge pattern in which the battery 41 is discharged to the optimum SOC value Qo immediately after the current point of time, thereafter, the battery 41 is not charged or discharged until immediately before the next use of the vehicle 4, and the battery 41 is charged to the necessary SOC value Qn immediately before the next use of the vehicle 4. The third charge and discharge pattern G23 is a charge and discharge pattern in which the battery 41 is not charged or discharged until the next use of the vehicle 4. The fourth charge and discharge pattern G24 is a charge and discharge pattern in which the battery 41 is discharged to the necessary SOC value Qn immediately after the current point of time, and the battery 41 is not charged or discharged until the next use of the vehicle 4.

Next, the calculator 205 determines the charge and discharge pattern having the minimum deterioration degree of the battery 41 of the second charge and discharge pattern G22, the third charge and discharge pattern G23, or the fourth charge and discharge pattern G24 selected in step S215 (step S216).

Specifically, in step S216, as in Step S212, the calculator 205 calculates the deterioration degree of the battery 41 in the first period in which the battery 41 is not charged or discharged by a product of the first period and a predetermined first deterioration coefficient associated with the current SOC value Qc. The calculator 205 calculates the deterioration degree of the battery 41 in the second period in which the battery 41 is charged or discharged by a product of a charge and discharge amount of the battery 41 in the second period and a predetermined second deterioration coefficient associated with the type of the battery 41.

That is, the calculator 205 calculates a deterioration degree D2 of the battery 41 in the second charge and discharge pattern G22 as in step S212, using the following Equation (2). In step S216, in Equation (2), the first period T1 included in the second charge and discharge pattern G22, in which the battery 41 is not charged or discharged, corresponds to a period (t13-t12) from a point of time when a time t12 has elapsed from the current point of time to a point of time when a time t13 has elapsed from the current point of time, as shown in FIG. 5. However, the first period T1 may be approximated by a period (T-0) from the current time to the next use of the vehicle 4.

The calculator 205 calculates a deterioration degree D3 of the battery 41 in the third charge and discharge pattern G23 using the following Equation (3).

$$D3 = T1 \times K1[Qc] \quad (3)$$

In Equation (3), T1 represents the first period during which the battery 41 is not charged or discharged. Specifically, the first period T1 included in the third charge and discharge pattern G23 corresponds to the period (T-0) from the current time until the next use of the vehicle 4 as shown in FIG. 5. In Equation (3), K1 [Qc] represents a first deterioration coefficient associated with the current SOC value Qc as in Equation (1).

The calculator 205 calculates a deterioration degree D4 of the battery 41 in the fourth charge and discharge pattern G24 using the following Equation (4).

$$D4 = (Qc-Qn) \times K2[Li] + T1 \times K1[Qn] \quad (4)$$

In Equation (4), T1 represents the first period during which the battery 41 is not charged or discharged. Specifically, the first period T1 included in the fourth charge and discharge pattern G24 corresponds to a period (T-t11) from a point of time when a time t11 has elapsed from the current point of time until the next use of the vehicle 4, as shown in FIG. 5. However, the first period T1 may be approximated by a period (T-0) from the current time to the next use of the vehicle 4. In Equation (4), K1 [Qn] represents a first deterioration coefficient associated with the necessary SOC value Qn. K2 [Li] represents the second deterioration coefficient associated with the lithium ion battery as in Equation (1). A method of calculating the deterioration degree of the battery 41 in each charge and discharge pattern described above is merely an example, and the deterioration degree of the battery 41 in each charge and discharge pattern may be calculated by another calculation method.

Upon determination in step S216 that the charge and discharge pattern having the minimum deterioration degree of the battery 41 is the second charge and discharge pattern G22 (second in step S216), the calculator 205 performs step S214. That is, the calculator 205 calculates the optimum SOC value Qo as the target value of the SOC value of the battery 41 at the time of discharging the battery 41.

In this case, in step S107 (FIG. 2), a result obtained by subtracting the current SOC value Qc acquired in step S101 from the optimum SOC value Qo as the target value is calculated as the target discharge amount, and the control information indicating an instruction to discharge the target discharge amount of power from the battery 41 of the vehicle 4 to the electrical device 32 is generated. As a result, in step S110 (FIG. 2), as shown in the second charge and discharge pattern G22 (FIG. 5), immediately after the current point of time, power is discharged from the battery 41 to the electrical device 32 until the SOC value of the battery 41 reaches the optimum SOC value Qo.

Upon determination in step S216 that the charge and discharge pattern having the minimum deterioration degree of the battery 41 is the third charge and discharge pattern G23 (third in step S216), the calculator 205 calculates the current SOC value Qc as the target value of the SOC value of the battery 41 at the time of discharging the battery 41, as in step S213 (step S217).

In this case, in step S107 (FIG. 2), 0, which is a result obtained by subtracting the current SOC value Qc acquired in step S101 from the current SOC value Qc as the target value, is calculated as the target discharge amount. In this case, since it is not necessary to discharge power from the battery 41 to the electrical device 32, the output unit 206 does not perform processing in and after step S108 (FIG. 2), and the controller 20 ends the operation of the discharge control. In this case, power is not discharged from the battery 41 of the vehicle 4 to the electrical device 32, and as shown in the third charge and discharge pattern G23 (FIG. 5), the battery 41 is left without being charged or discharged immediately after the current point of time.

However, the present disclosure is not limited thereto, and in step S107 (FIG. 2), the output unit 206 may generate control information indicating an instruction to discharge power of a target discharge amount of 0 from the battery 41 of the vehicle 4 to the electrical device 32 and perform the processing in and after step S108. In this case, in step S110 (FIG. 2), the target discharge amount of 0 is discharged from the battery 41 of the vehicle 4 to the electrical device 32. That is, power is not actually discharged from the battery 41 of the vehicle 4 to the electrical device 32, and as shown in the third charge and discharge pattern G23 (FIG. 5), the battery 41 is left without being charged or discharged immediately after the current point of time.

Upon determination in step S216 that the charge and discharge pattern having the minimum deterioration degree of the battery 41 is the fourth charge and discharge pattern G24 (fourth in step S216), the calculator 205 calculates the necessary SOC value Qn as the target value of the SOC value of the battery 41 at the time of discharging the battery 41 (step S218).

In this case, in step S107 (FIG. 2), a result obtained by subtracting the current SOC value Qc acquired in step S101 from the necessary SOC value Qn as the target value is calculated as the target discharge amount, and the control information indicating an instruction to discharge the target discharge amount of power from the battery 41 of the vehicle 4 to the electrical device 32 is generated. As a result, in step S110 (FIG. 2), as shown in the fourth charge and discharge pattern G24 (FIG. 4), immediately after the current point of time, power is discharged from the battery 41 to the electrical device 32 until the SOC value of the battery 41 reaches the necessary SOC value Qn.

Next, processing performed in the communication terminal 9 owned by the user of the vehicle 4 will be described.

Figure 6:
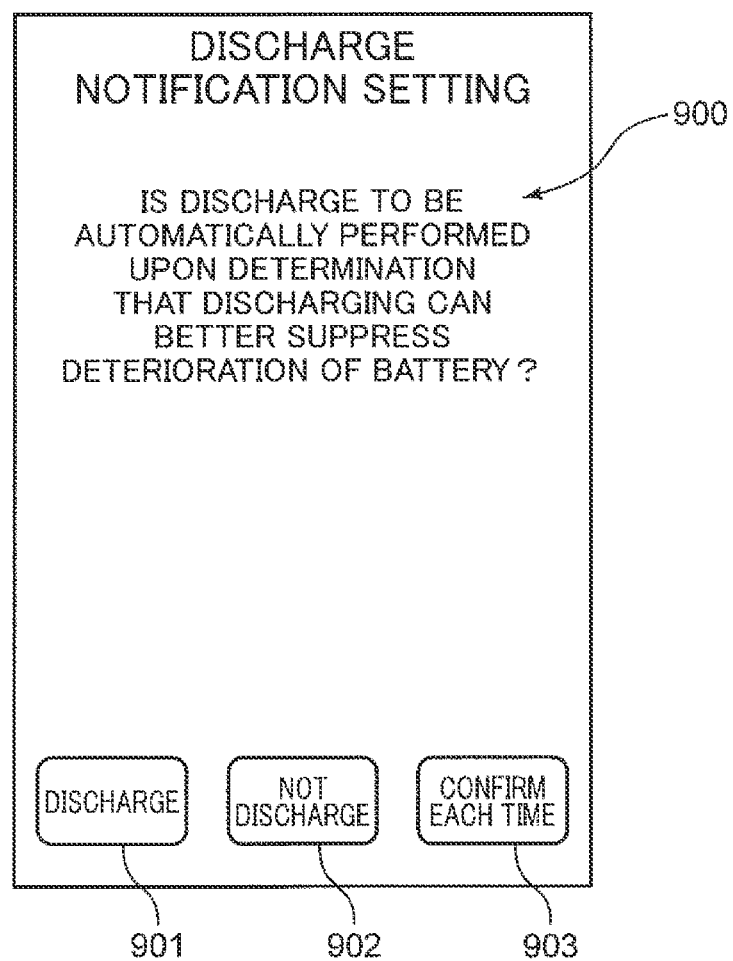
FIG. 6 is a diagram illustrating an example of a discharge notification setting screen.

FIG. 6 is a diagram illustrating an example of a discharge notification setting screen W1. The communication terminal 9 can display the discharge notification setting screen W1 illustrated in FIG. 6 on the display included in the communication terminal 9 at an arbitrary timing in accordance with an operation by the user of the vehicle 4. The discharge notification setting screen W1 is a screen for presetting information to be returned to the server 2 upon receipt of the inquiry information inquiring whether to perform discharge indicated by the control information generated in step S107 (FIG. 2) and transmitted from the server 2 in step S108 (FIG. 2).

Specifically, as shown in FIG. 6, the discharge notification setting screen W1 includes a message 900 indicating that it is inquired whether to automatically return the inquiry information to the server 2 upon receipt of the inquiry information, a permission button 901, a non-permission button 902, and an each-time confirmation button 903.

The permission button 901 is an operation button for setting to automatically return information indicating that the discharge indicated by the control information is to be performed to the server 2 upon receipt of the inquiry information. That is, when the user presses the permission button 901, thereafter, the communication terminal 9 automatically returns the information indicating that the discharge indicated by the control information is to be performed to the server 2 upon receipt of the inquiry information.

The non-permission button 902 is an operation button for setting to automatically return information indicating that the discharge indicated by the control information is not to be performed to the server 2 upon receipt of the inquiry information. That is, when the user presses the non-permission button 902, thereafter, the communication terminal 9 automatically returns the information indicating that the discharge indicated by the control information is not to be performed to the server 2 upon receipt of the inquiry information.

Figure 7:
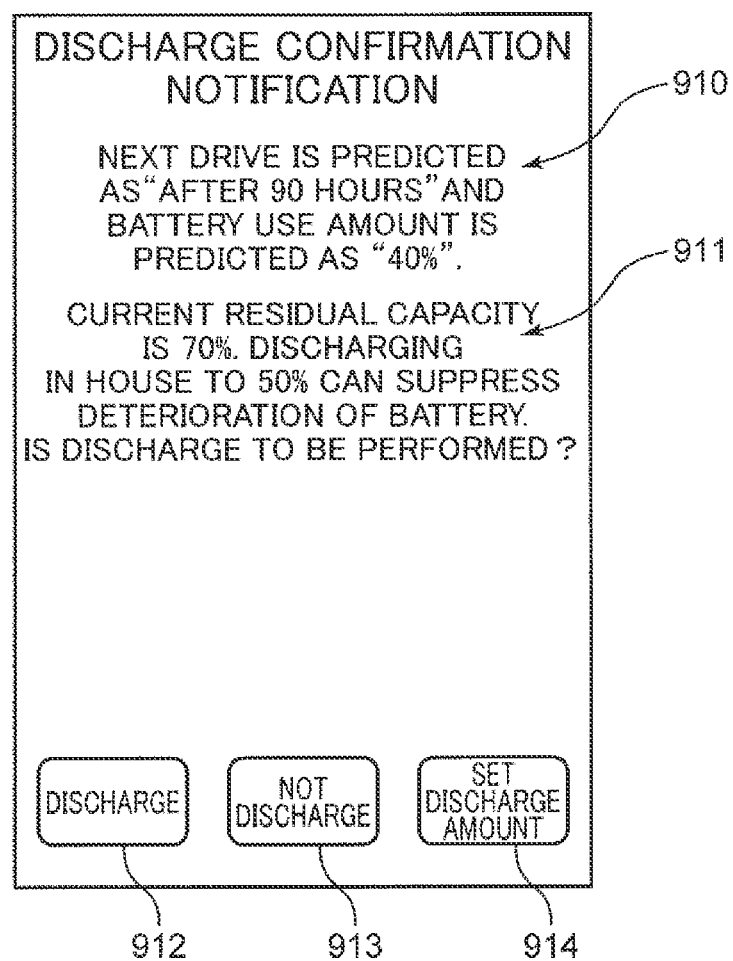
FIG. 7 is a diagram illustrating an example of a discharge confirmation screen.

The each-time confirmation button 903 is an operation button for setting to confirm the user whether to perform the discharge indicated by the control information upon each receipt of the inquiry information. That is, when the user presses the each-time confirmation button 903, thereafter, the communication terminal 9 displays a discharge confirmation screen W2 illustrated in FIG. 7 on the display included in the communication terminal 9 upon each receipt of the inquiry information. FIG. 7 is a diagram illustrating an example of the discharge confirmation screen W2.

Specifically, as illustrated in FIG. 7, the discharge confirmation screen W2 includes a prediction result message 910, a discharge content message 911, a permission button 912, a non-permission button 913, and a discharge amount setting button 914.

The prediction result message 910 is a message indicating the time from the current time to the date and time when the vehicle 4 is used next and the necessary power amount for the next use of the vehicle 4. The prediction result message 910 is generated using the prediction information predicted in step S103 (FIG. 2). Therefore, in step S108 (FIG. 2), the output unit 206 transmits the inquiry information and the prediction information predicted in step S103 (FIG. 2) to the communication terminal 9.

The discharge content message 911 is a message indicating the content of the discharge indicated by the control information. Specifically, the discharge content message 911 includes the current SOC value of the battery 41 and the target value of the SOC value of the battery 41 when the discharge indicated by the control information is performed. The discharge content message 911 is generated by using the current SOC value acquired in step S101 (FIG. 2) and the target value calculated in step S106. Therefore, in step S108 (FIG. 2), the output unit 206 transmits the inquiry information and information indicating the current SOC value acquired in step S101 (FIG. 2) and the target value calculated in step S106 to the communication terminal 9.

The permission button 912 is an operation button for returning the information indicating that the discharge indicated by the control information is to be performed. That is, upon receipt of the inquiry information, when the user presses the permission button 912 after the communication terminal 9 displays the discharge confirmation screen W2, the communication terminal 9 returns the information indicating that the discharge indicated by the control information is to be performed to the server 2.

The non-permission button 913 is an operation button for returning the information indicating that the discharge indicated by the control information is not to be performed. That is, upon receipt of the inquiry information, when the user presses the non-permission button 913 after the communication terminal 9 displays the discharge confirmation screen W2, the communication terminal 9 returns the information indicating that the discharge indicated by the control information is not to be performed to the server 2.

The discharge amount setting button 914 is an operation button for receiving an input of an SOC value that is larger than or equal to the target value included in the discharge content message 911 and smaller than the current SOC value of the battery 41 included in the discharge content message 911, and selecting a discharge mode of discharging the battery 41 to the SOC value having been received.

That is, upon receipt of the inquiry information, when the user presses the discharge amount setting button 914 after the communication terminal 9 displays the discharge confirmation screen W2 on the display, the communication terminal 9 displays, on the display, an operation screen on which an SOC value can be input, the SOC value being larger than or equal to the target value included in the discharge content message 911 and smaller than the current SOC value of the battery 41 included in the discharge content message 911. When the SOC value is input by the user operating the operation screen, the communication terminal 9 receives the input SOC value and returns, to the server 2, information indicating that the discharge mode of discharging the battery 41 to the received SOC value is to be selected.

In step S108 (FIG. 2), it is assumed that the output unit 206 acquires, via the communication unit 22, the information returned from the communication terminal 9 and indicating that the discharge mode is to be selected. In this case, the output unit 206 performs step S109 (FIG. 2), and in step S109, transmits information instructing to discharge the battery 41 in the discharge mode indicated by the acquired information instead of the control information generated in step S107 to the charge and discharge device 5.

Upon receipt of the transmitted information, the charge and discharge device 5 discharges power from the battery 41 to the electrical device 32 outside the vehicle 4 in accordance with the received information until the SOC value of the battery 41 reaches an SOC value that is indicated by the discharge mode and is larger than or equal to the target value calculated in step S106 and smaller than the current SOC value acquired in step S101 (FIG. 2).

The above aspect is merely an example of the embodiment according to the present disclosure, and is not intended to limit the present disclosure to the above aspect. For example, modified embodiments described below may be adopted.

(1) In step S108 (FIG. 2), the output unit 206 may transmit the inquiry information to the operation panel 321 (FIG. 1) in the building 3 owned by the user of the vehicle 4 to inquire of the user of the vehicle 4 whether to permit the discharge indicated by the control information generated in step S107. In this case, the operation panel 321 (FIG. 1) may display the discharge notification setting screen W1 shown in FIG. 6 and the discharge confirmation screen W2 shown in FIG. 7 on the display, and receive the operation on these screens by the user.

(2) The discharge confirmation screen W2 illustrated in FIG. 7 may not include the discharge amount setting button 914. The discharge confirmation screen W2 may be provided with an operation button for displaying a discharge operation screen (not illustrated) on which an operation to designate one or more electrical devices 32 to which power discharged from the battery 41 is to be supplied and an amount of power to be supplied to each of the one or more electrical devices 32 can be performed.

In addition to the above, when the operation button is pressed, the communication terminal 9 or the operation panel 321 may display the discharge operation screen, and return, to the server 2, detailed discharge information including information for identifying one or more electrical devices 32 designated on the discharge operation screen and information indicating the amount of power to be supplied to each of the one or more electrical devices 32 together with the information indicating that the discharge indicated by the control information is to be performed.

In step S109 (FIG. 2), the output unit 206 may transmit the detailed discharge information returned from the communication terminal 9 or the operation panel 321 to the charge and discharge device 5 together with the control information. In step S10 (FIG. 2), the charge and discharge device 5 may supply the power charged in the battery 41 of the vehicle 4 to each of the one or more electrical devices 32 indicated by the detailed discharge information received from the server 2 with the power amount indicated by the detailed discharge information. At that time, in the communication terminal 9 or the operation panel 321, icon images representing the battery 41 and each of the one or more electrical devices 32 may be displayed on the display, and an image indicating that power is supplied may be displayed from the icon image representing the battery 41 toward each of the icon images representing each of the one or more electrical devices 32.

(3) Step S105 (FIG. 2) may be omitted. Accordingly, upon determination in step S104 that the current SOC value is larger than or equal to the optimum SOC value (YES in step S104), processing in and after step S106 (FIG. 2) may be performed regardless of the unused time as time from the current time until the date and time when the vehicle 4 is used next.

(4) Step S108 (FIG. 2) may be omitted. Accordingly, processing in and after step S109 (FIG. 2) is performed after the control information is generated in step S107, and thus the discharge indicated by the control information may be performed without inquiring of the user of the vehicle 4.

In the embodiment and the modified embodiments described above, the mode in which the controller 20 of the server 2 performs the discharge control has been described. Alternatively, control similar to the discharge control performed by the server 2 may be performed by a computer included in the charge and discharge device 5 or the controller 40 included in the vehicle 4. In this case, a learned model similar to the learned model 211 stored in the storage 21 of the server 2 may be stored in a storage device (not illustrated) or the storage 42 included in the charge and discharge device 5.

The computer of the charge and discharge device 5 or the controller 40 of the vehicle 4 need not function similarly to the learning unit 200. In this case, of the computer of the charge and discharge device 5 or the controller 40 of the vehicle 4 may request the server 2 to transmit the learned model 211 stored in the storage 21, store the learned model 211 returned from the server 2 in the storage device (not illustrated) or the storage 42 in response to the request, and use the learned model 211.

INDUSTRIAL APPLICABILITY

The present disclosure is effective for suppressing deterioration of the battery of the vehicle by giving due consideration to the past use history of the vehicle by an individual user.

The invention claimed is:

1. A control method of controlling a charge and discharge device that charges and discharges a battery of a vehicle, the method comprising, by a computer:

acquiring a current SOC value of the battery;

acquiring history information related to a past power consumption amount in the vehicle;

inputting the history information having been acquired to a learned model that has learned a relationship between the past power consumption amount of the vehicle and a necessary power amount when the vehicle is used next, and acquiring prediction information related to the necessary power amount;

determining whether the current SOC value is larger than an optimum SOC value determined in advance for suppressing deterioration of the battery;

upon determination that the current SOC value is larger than the optimum SOC value, calculating a target value of an SOC value of the battery at a time of discharging the battery based on the current SOC value, the optimum SOC value, and the prediction information; and outputting, to the charge and discharge device, control information instructing to discharge power from the battery to an electrical device outside the vehicle until the SOC value of the battery reaches the target value.

2. The control method according to claim 1, wherein
the history information input to the learned model further includes information indicating a past use date and time of the vehicle, and
the prediction information includes prediction date and time information indicating a date and time when the vehicle is used next.

3. The control method according to claim 2, wherein
the determining further includes determining whether an unused time as a time from a current time to a date and time indicated by the prediction date and time information is longer than a predetermined time, and
the calculating includes calculating the target value upon determination that the current SOC value is larger than the optimum SOC value and the unused time is longer than the predetermined time.

4. The control method according to claim 1, wherein
the calculating includes
calculating a necessary SOC value that covers the necessary power amount based on the prediction information, and
calculating the optimum SOC value as the target value when the optimum SOC value is larger than the necessary SOC value.

5. The control method according to claim 1, wherein
the calculating includes
calculating a necessary SOC value that covers the necessary power amount based on the prediction information, and
when the optimum SOC value is smaller than or equal to the necessary SOC value,
selecting a charge and discharge pattern having a minimum deterioration degree of the battery among a plurality of charge and discharge patterns determined in advance, based on the current SOC value, the optimum SOC value, and the necessary SOC value, and calculating the target value according to the charge and discharge pattern having been selected.

6. The control method according to claim 5, wherein
the calculating includes
when the necessary SOC value is larger than the optimum SOC value and the current SOC value, selecting a charge and discharge pattern having a minimum deterioration degree of the battery,
out of a first charge and discharge pattern of charging the battery to the necessary SOC value immediately before the vehicle is used next, and a second charge and discharge pattern of discharging the battery to the optimum SOC value immediately after a current point of time and charging the battery to the necessary SOC value immediately before the vehicle is used next,
calculating the current SOC value as the target value when the first charge and discharge pattern is selected, and
calculating the optimum SOC value as the target value when the second charge and discharge pattern is selected.

7. The control method according to claim 5, wherein
the calculating includes
when the necessary SOC value is larger than the optimum SOC value and smaller than the current SOC value, selecting a charge and discharge pattern having a minimum deterioration degree of the battery,
among a second charge and discharge pattern of discharging the battery to the optimum SOC value immediately after the current point of time and charging the battery to the necessary SOC value immediately before the vehicle is used next,
a third charge and discharge pattern of not charging or discharging the battery until the vehicle is used next, and
a fourth charge and discharge pattern of discharging the battery to the necessary SOC value immediately after the current point of time and not charging or discharging the battery until the vehicle is used next,
calculating the optimum SOC value as the target value when the second charge and discharge pattern is selected,
calculating the current SOC value as the target value when the third charge and discharge pattern is selected, and
calculating the necessary SOC value as the target value when the fourth charge and discharge pattern is selected.

8. The control method according to claim 5, wherein
the charge and discharge pattern includes at least one of a first period in which the battery is not charged or discharged or a second period in which the battery is charged or discharged,
a deterioration degree of the battery in the first period is calculated by a product of the first period and a predetermined first deterioration coefficient associated with the current SOC value, and
a deterioration degree of the battery in the second period is calculated by a product of a charge and discharge amount of the battery in the second period and a predetermined second deterioration coefficient associated with a type of the battery.

9. The control method according to claim 1, wherein
the outputting includes
transmitting information inquiring whether to perform discharge indicated by the control information to a communication terminal owned by a user of the vehicle before outputting the control information, and
outputting the control information when information indicating that the discharge indicated by the control information is to be performed is returned from the communication terminal.

10. The control method according to claim 1, wherein
the outputting includes
receiving an input of an SOC value that is larger than or equal to the target value and smaller than the current SOC value before outputting the control information,
transmitting information inquiring whether to select a discharge mode of discharging the battery to the SOC value having been received to the communication terminal owned by the user of the vehicle, and
outputting information instructing to discharge the battery in the discharge mode instead of the control information to the charge and discharge device when the information indicating that the discharge mode is to be selected is returned from the communication terminal.

11. A control device that controls a charge and discharge device that charges and discharges a battery of a vehicle, the control device comprising:
a first acquisition unit that acquires a current SOC value of the battery;
a second acquisition unit that acquires history information related to a past power consumption amount in the vehicle;
a third acquisition unit that inputs the history information having been acquired to a learned model that has learned a relationship between the past power consumption amount of the vehicle and a necessary power amount when the vehicle is used next, the third acquisition unit acquiring prediction information related to the necessary power amount;

a determination unit that determines whether the current SOC value is larger than an optimum SOC value determined in advance for suppressing deterioration of the battery:

a calculator that calculates a target value of an SOC value of the battery at a time of discharging the battery based on the current SOC value, the optimum SOC value, and the prediction information, upon determination that the current SOC value is larger than the optimum SOC value; and an output unit that outputs, to the charge and discharge device, control information instructing to discharge power from the battery to an electrical device outside the vehicle until the SOC value of the battery reaches the target value.

12. A non-transitory computer readable storage medium storing a control program of a control device that controls a charge and discharge device that charges and discharges a battery of a vehicle, the control program causing a computer included in the control device to function as:

a first acquisition unit that acquires a current SOC value of the battery;

a second acquisition unit that acquires history information related to a past power consumption amount in the vehicle;

a third acquisition unit that inputs the history information having been acquired to a learned model that has learned a relationship between the past power consumption amount of the vehicle and a necessary power amount when the vehicle is used next, the third acquisition unit acquiring prediction information related to the necessary power amount;

a determination unit that determines whether the current SOC value is larger than an optimum SOC value determined in advance for suppressing deterioration of the battery;

a calculator that calculates a target value of an SOC value of the battery at a time of discharging the battery based on the current SOC value, the optimum SOC value, and the prediction information, upon determination that the current SOC value is larger than the optimum SOC value; and an output unit that outputs, to the charge and discharge device, control information instructing to discharge power from the battery to an electrical device outside the vehicle until the SOC value of the battery reaches the target value.

\* \* \* \* \*